United States Patent [19]

Isserlis

[11] 4,344,779
[45] Aug. 17, 1982

[54] AIR POLLUTION CONTROL SYSTEM

[76] Inventor: Morris D. Isserlis, 3755 Poinciana Dr., Apt. 507, Bldg. 7, Lake Worth, Fla. 33463

[21] Appl. No.: 181,890

[22] Filed: Aug. 27, 1980

[51] Int. Cl.³ ............................................... B01D 47/14
[52] U.S. Cl. ........................................ 55/233; 55/228; 55/257 C; 55/300; 261/81; 261/94; 261/DIG. 9; 422/169
[58] Field of Search ............. 55/233, 234, 300, 257 R, 55/257 NP, 257 PP, 228, 257 C; 261/94, 95, 116, 81, 1, DIG. 48, DIG. 9; 422/169

[56] References Cited

U.S. PATENT DOCUMENTS

| | | | |
|---|---|---|---|
| 1,936,154 | 11/1933 | Carter | 55/300 X |
| 2,400,810 | 5/1946 | Clarke et al. | 261/94 |
| 2,691,423 | 10/1954 | McIlvaine | 261/94 X |
| 3,155,472 | 11/1964 | Huppke | 261/81 X |
| 3,406,953 | 10/1968 | Moore | 55/233 X |
| 3,458,178 | 7/1969 | Warnick | 55/300 X |
| 3,525,197 | 8/1970 | Sheehan | 261/94 X |
| 3,926,592 | 12/1975 | Leva | 55/233 X |
| 4,058,455 | 11/1977 | Schier | 55/300 X |
| 4,126,539 | 11/1978 | Derr, Jr. et al. | 261/94 X |
| 4,184,858 | 1/1980 | Walker | 55/233 X |

Primary Examiner—Richard L. Chiesa
Attorney, Agent, or Firm—Robert A. Green

[57] ABSTRACT

The disclosure is of gas-cleaning apparatus comprising a chamber having a downwardly vertical gas and fluid flow path, with the gas and fluid moving at high velocity. One or more layers of solids is disposed across the path of gas and fluid flow, and these solids and the spaces between them act as multiple venturi scrubbers and impingement surfaces so that the gas is cleaned by agglomeration and absorption. A vibrator is coupled to the layers of solids for vibrating them to prevent matter removed from the gas from adhering thereto and blocking the passages therebetween.

Also disclosed is a centrifugal cyclone separator, adapted to be coupled to the output of the above-described gas scrubber, comprising an upright chamber containing a rotatable cylinder carrying blades on its outer surface, the free edges of the blades being positioned close to the inner wall of the chamber. The blade configuration and high rotational velocity and long distance travel of the gases provide improved separating action.

The above apparatus is utilized in a system for converting sulfur dioxide in the clean gas to sulfuric acid.

6 Claims, 7 Drawing Figures

AIR POLLUTION CONTROL SYSTEM

BACKGROUND OF THE INVENTION

In view of the abundance and availability of coal, it would be highly desirable to be able to use coal as a source of energy instead of oil and gas. Because of air pollution and ecology problems due to the difficulty of cleaning out products of combustion, fly ash, mist or fumes, coal is not a completely desirable source of energy, and no completely satisfactory solution to the problem has been suggested up to the present time.

It is well known that venturi scrubbers are effective for removing fine particles from gases. However, as efficient as those devices are, there is a need for even greater efficiency, and this is provided by the present invention, which acts like multiple venturi collectors which operate with a combination of venturi agglomeration and impingement and inertial separation.

DESCRIPTION OF THE INVENTION

The first portion of the system of the invention to be described is a wet type, self-cleaning, multiple impingement, particulate collector and agglomerator utilizing high velocity gas and liquid flow for optimum efficiency in performing a gas cleaning operation.

Figure 1:
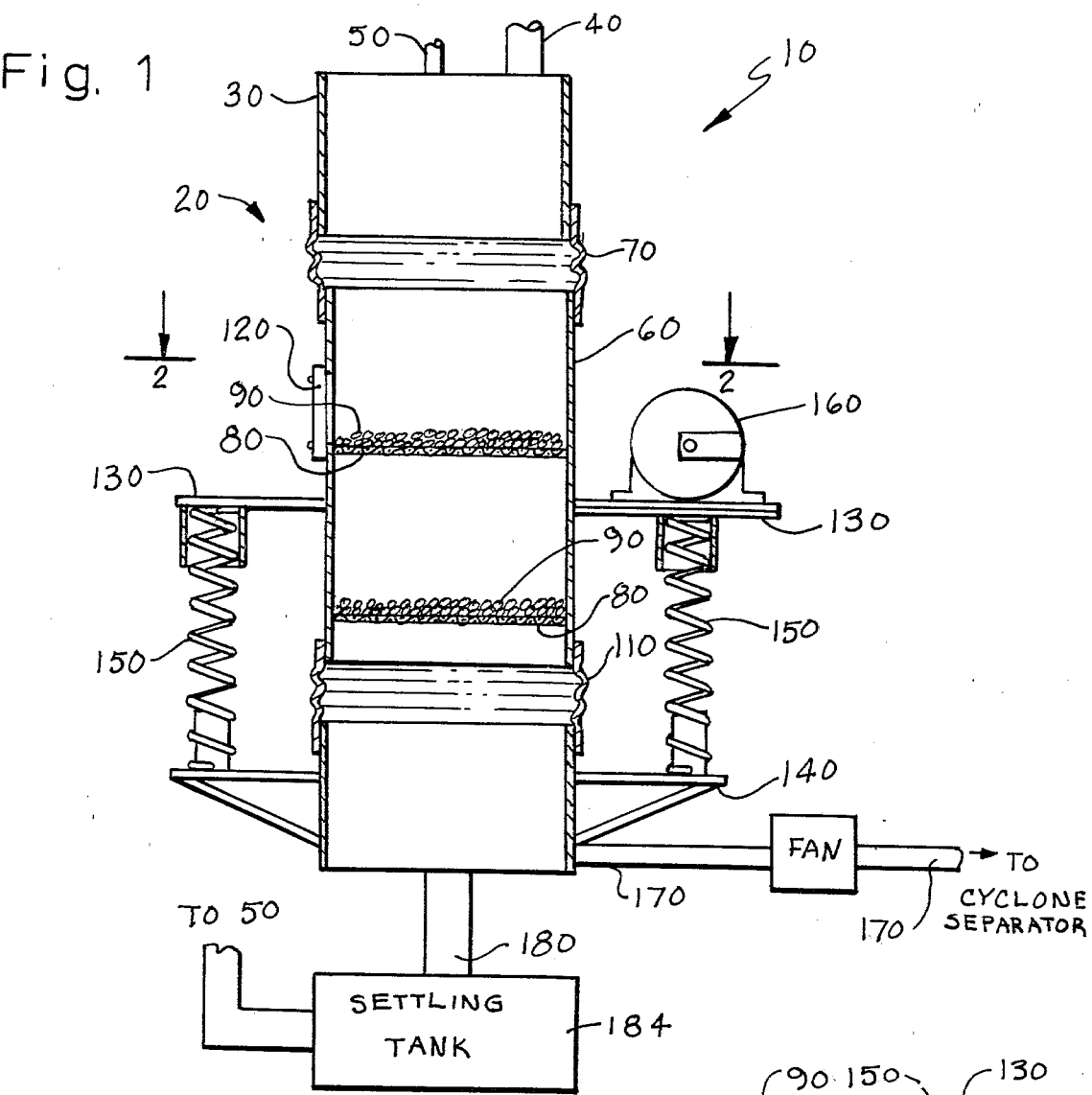
FIG. 1 is a sectional, elevational view of an impingement scrubber embodying the invention.
Figure 2:
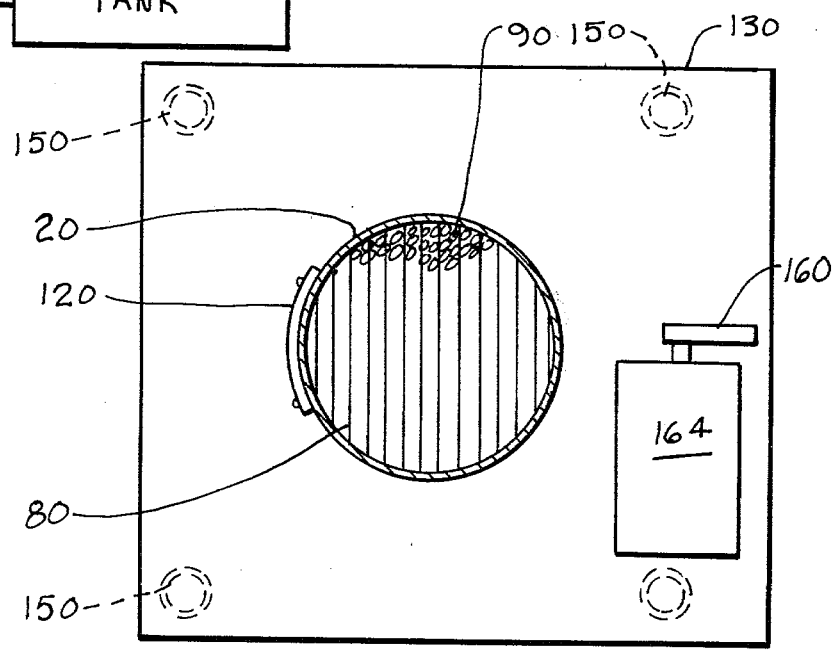
FIG. 2 is a sectional view along the lines 2—2 in FIG. 1.

This portion of the invention 10, referring to FIGS. 1 and 2, includes a cylindrical tower or chamber 20, of suitable length and diameter, including an upper portion 30 having an intake flue 40 by which the gas to be cleaned is introduced into the chamber 20. An inlet pipe 50 is also provided for introducing a diffuse spray of water or other liquid into this upper portion along with the gas.

The tower 20 also includes an intermediate portion 60 coupled to the upper portion by means of a flexible annular sleeve 70 and carrying internally, at any suitable location, one or more horizontal apertured support plates 80, such as screens, on which are disposed one or more layers of impingement solids hereinafter called a "charge". The charge solids may be spheres or cylinders or the like having smooth surfaces, and they may be of glass, ceramic, or the like. The chamber also includes a lower portion 100 which is also coupled to the intermediate portion by a second flexible annular sleeve 110. The upper, intermediate, and lower portions of the chamber are of any suitable length.

A clean-out door 120 is provided in the intermediate portion 60 to provide access to screens 80 and the charges 90 carried thereby.

A gas outlet flue 170 extends laterally from the lower portion of the tower, and a high speed fan 174 is provided at a suitable location in the outlet flue or in the output of a cyclone separator to be described.

A water outlet pipe 180 also extends from the lower portion of the tower to a suitable reservoir or settling tank 184, from which it can be recycled into inlet pipe 50.

According to the invention, means are provided for vibrating the intermediate portion 60 of the chamber 20 and thus physically agitating the charge on the screen or screens 80.

In one suitable vibrator arrangement, a first horizontal upper platform 130 is secured to the outer surface of the intermediate portion of the chamber, and a similar second lower platform 140 is secured to the lower portion 100 of the chamber, and compression springs 150 are provided, preferably at at least four locations between the two platforms. A vibrator apparatus, for example a motor 164 carrying an unbalanced weight 160, or a suitably shaped cam, is mounted on the upper platform 130, and, as it operates, it vibrates the intermediate portion 60 of the chamber and thus provides the desired vibration of the screens 80 and agitation of all of the solids in charge 90.

In operation of the apparatus of FIG. 1, with the vibrator mechanism turned on, flue gas and water are introduced into the upper portion of the tower through flue 40 and pipe 50. The gas is drawn through the chamber at high speed by fan 174. The contaminants or particulates in the gas and liquid entering the chamber 20 impinge on the solids in charges 90 and agglomerate and are absorbed in the liquid, and this absorbed material is washed through the screens 80 by the water. The water, including agglomerate solids, is directed through outlet pipe 180 to reservoir tank 184, where settling takes place and then the water is recycled, essentially free of solids, into the pipe 50 in the upper portion of the tower. The essentially clean gas with agglomerated particles is removed through discharge flue 170 by fan 174.

It is noted that, in the operation of scrubber 10, the spaces between the solids in charge 90 act like multiple venturi collectors or scrubbers, and, in addition, the solids provide hundreds or even thousands of impact points for the gas which is moving at high velocity. With these factors operating, a homogenizing action occurs, and the gas and its particulate content dissolves in the water, and the particles thus collected become agglomerated.

In the apparatus 10, the solids of charge 90 may have a diameter of about 1 inch or more, as desired, or as large as is practical, and they may be as small as about ⅛ of an inch in diameter. The vibration distance of the intermediate portion of the chamber 20 may be approximately from about ¼ of an inch to about 2 inches, as required under any particular set of parameters.

It is noted that the cleaning solids of charge 90 are selected because they have smooth curved surfaces which are easily cleaned, and shapes such as spheres, ovoids, or cylinders, or the like, and they are made of glass, ceramic, or the like.

As noted, the action of the apparatus 10 is a combination of venturi agglomeration and impingement and inertial separation, and it provides improved particulate collection of particles as small as one micron in diameter by means of:

(1) Multiple, paralled venturi agglomeration by high velocity passage of gases through a bed of small spheres, cylinders, or the like.

(2) Impingement separation and collection through spheres or the like at high velocity.

(3) Self-cleaning of the spheres by vibration.

The apparatus 10 has such efficiency that, with a pressure drop of 24 inches of water, practically any mist or fume can be collected, and an almost invisible stack plume results. For similar results, standard venturi collectors may require up to 80 inches of water pressure drop.

Because some water is entrained in the high-speed gas leaving the apparatus 10 in flue 170, it is desirable to direct the gas from the apparatus 10 to the second portion of the invention, a cyclone centrifugal separator 190, to complete the cleaning of the gas. The cyclone centrifugal separator 190, referring to FIGS. 3 and 4, includes a cylindrical chamber 200 having a horizontal top wall 210 at its upper end, with a tangential gas inlet flue 220 coupled to the top wall 210 to feed gases into the chamber. Inside the chamber is mounted a vertical rotor 230 comprising a hollow cylinder 240 having a closed upper end 250 and an open lower end 260. The rotor cylinder 240 is suitably secured to a vertical central shaft 270 which extends through the top wall 210 of the chamber and is suitably coupled to a motor, by which it is rotated. Suitable supports 271 are provided between shaft 270 and the wall of the cylinder 240.

The outer surface of the rotor cylinder 240 is provided with a plurality of vertical, generally rectangular, blades 280 spaced apart about the cylinder. As an example, eight blades may be provided. The blades 280 are oriented generally in the same direction as the vertical axis of the cylinder 240. The chamber 200 and rotor cylinder 240 are arrayed so that the blades 280 are about four inches wide, and they are spaced about one inch from the inner wall of the cylinder 240.

The lower end of the chamber 200 is coupled to an outlet gas flue 290 which is a pipe having its inner end 292 positioned just above the lower ends 282 of the blades 280. The gas outlet flue 290 is coupled to a suitable fan 294 which may be fan 174 of FIG. 1.

An outlet pipe 300 for solids removed from the gas and liquids is also coupled to the lower end of the chamber 200.

A source of water is coupled to the chamber 200 through pipe 252, in the top wall 250, and the water washes solids out through pipe 300.

Figure 3:
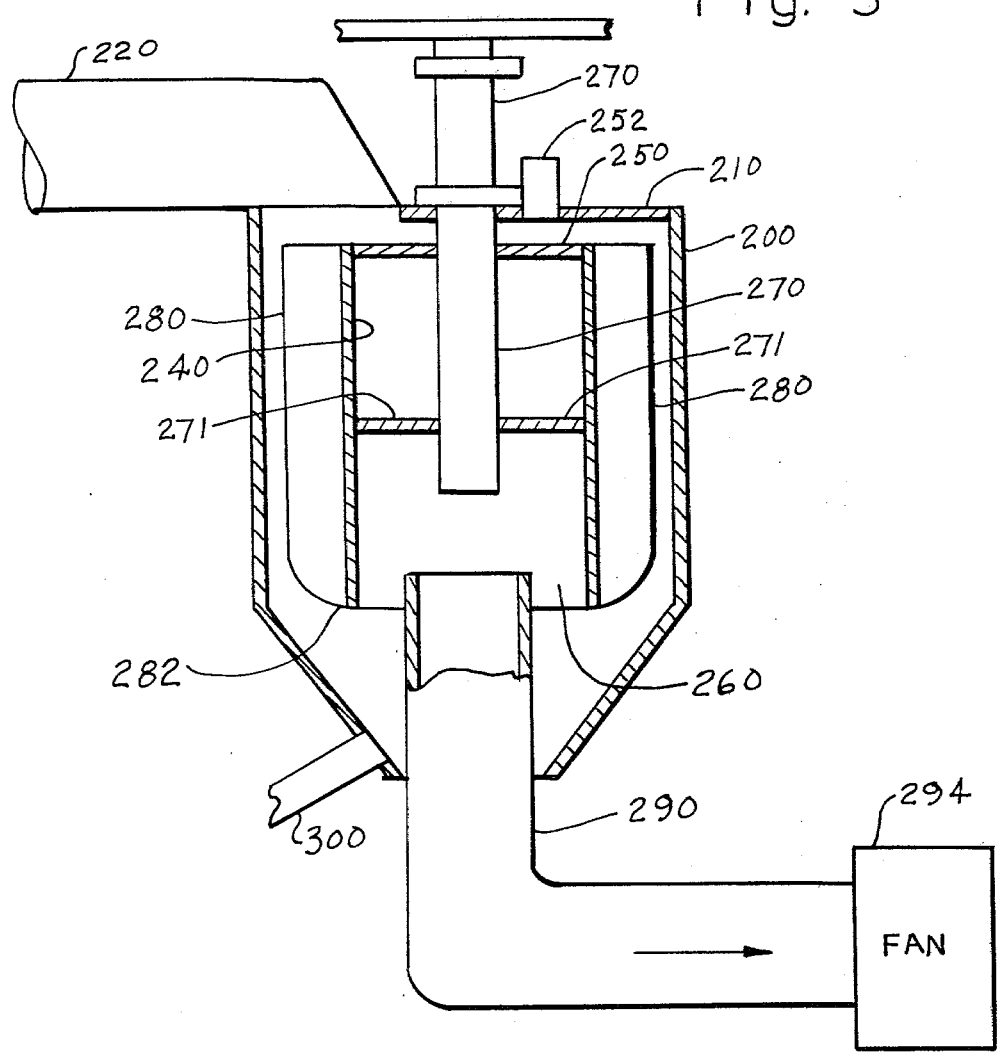
FIG. 3 is a sectional, elevational view of a centrifugal cyclone separator of the invention.
Figure 4:
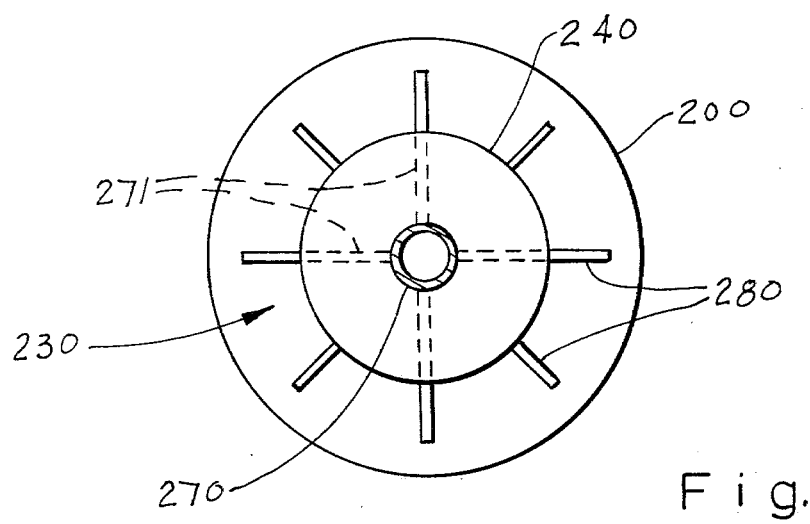
FIG. 4 is a sectional view of FIG. 3.

In operation of the apparatus of FIGS. 3 and 4, the rotor 230 is operated at about 1800 RPM, for example, and gases to be cleaned are introduced into the chamber 200 through the inlet flue 220. Water is introduced through pipe 252. The rotation of the rotor causes particles in the gas to be driven against the inner wall of the chamber and to drop to the bottom of the chamber and be removed through the pipe 300 by the water flow. The clean gases flow into the outlet flue 290 and out of the chamber. The water is provided to help wash the removed solids into outlet pipe 300 and to recycling means as used in the apparatus 10 of FIGS. 1 and 2.

The advantages of the cyclone, which are due in part to the short distance of about five inches from the cylinder 240 to the inner wall of the chamber, are that a much greater separating action is achieved, and in fact, in a cyclone which was actually tested, the gases were so clean that the final exhaust fan had no encrustation of solids on its blades. Thus, an additional advantage is that fan balance is not disturbed.

Thus, the cyclone of this invention is an improved collector separator compared to any usual cyclone collector of dusts or liquids or mists.

By the use of internal revolving blades in a cylinder, the force of gravity can be increased many times over that in a prior art cyclone. In a prior art cyclone, which, for example, is two feet in diameter with 60 ft/sec. intake velocity, the force of gravity is increased 112 times.

In the cyclone of the invention, which is two feet in diameter, has 1800 R.P.M. rotation of a 22 inch O.D. rotor, the gravity force increase is 1012 times. In addition, the separating distance to remove particles from the gas stream is only five inches in the invention, and in a prior art cyclone, is much more. In addition, in the gas discharge in the invention, there is a change of gas direction which gives further separating action.

Figure 5:
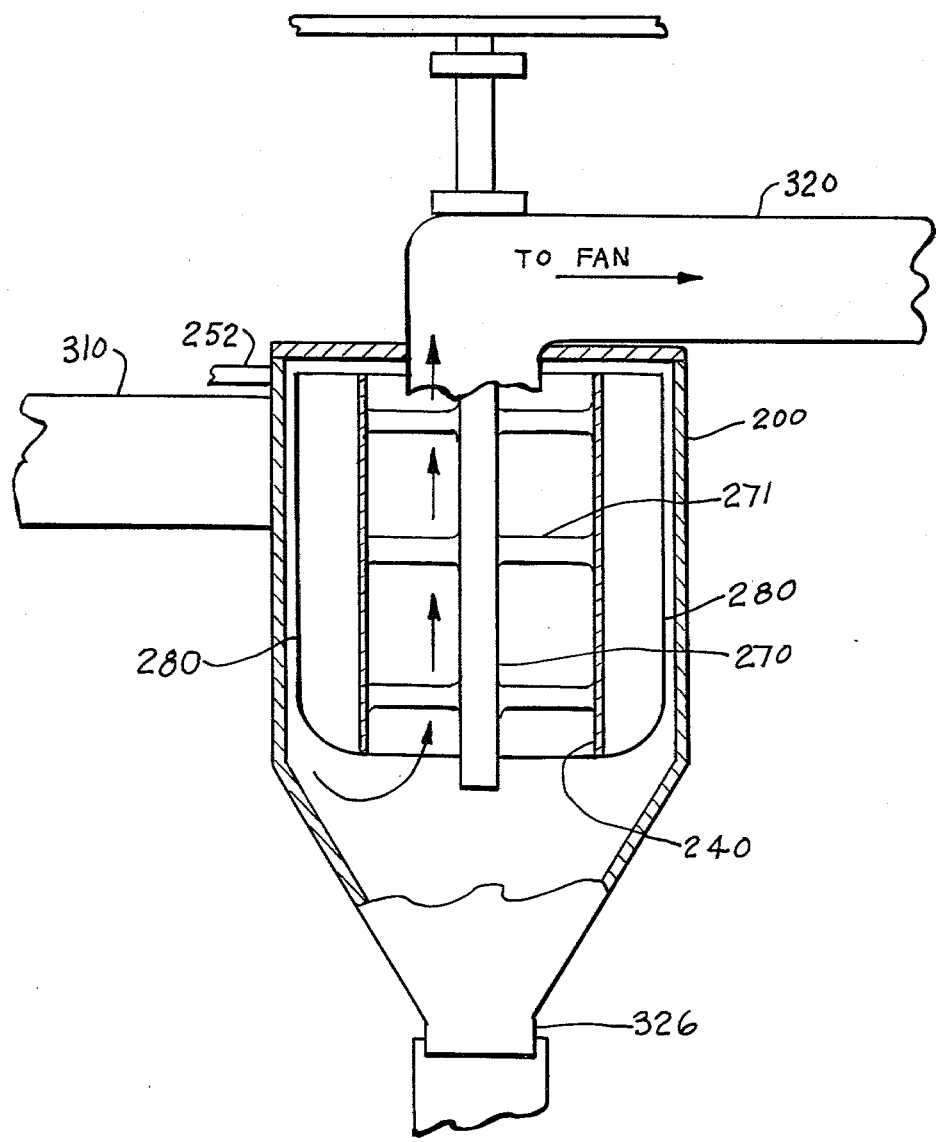
FIG. 5 is a sectional, elevational view of a modification of the centrifugal cyclone separator of the invention.

A modification of the cyclone separator of the invention is illustrated in FIG. 5. This embodiment of the invention may be wet or dry and includes a cylindrical chamber 200 having a gas inlet flue 310 coupled tangentially to the side wall of the chamber below its upper end. An outlet flue 320 is connected to the top wall of the chamber and is coupled to a fan. The rotor cylinder 240 is open at both ends so that a flow path is provided therethrough to the outlet flue. The lower end of the chamber 200 is coupled to an outlet flue 326, through which solids and liquid can be discharged.

In operation of the cyclone separator of FIG. 5, the particles again are removed from the gases by the rotor blades 280, and the clean gases are drawn upwardly through the rotor cylinder and out of the outlet flue 320. Removed solids and liquids are fed out of the chamber through the lower end thereof.

This embodiment of the invention has the advantage that it may be wet or dry in addition to having the advantages set forth above.

Figure 6:
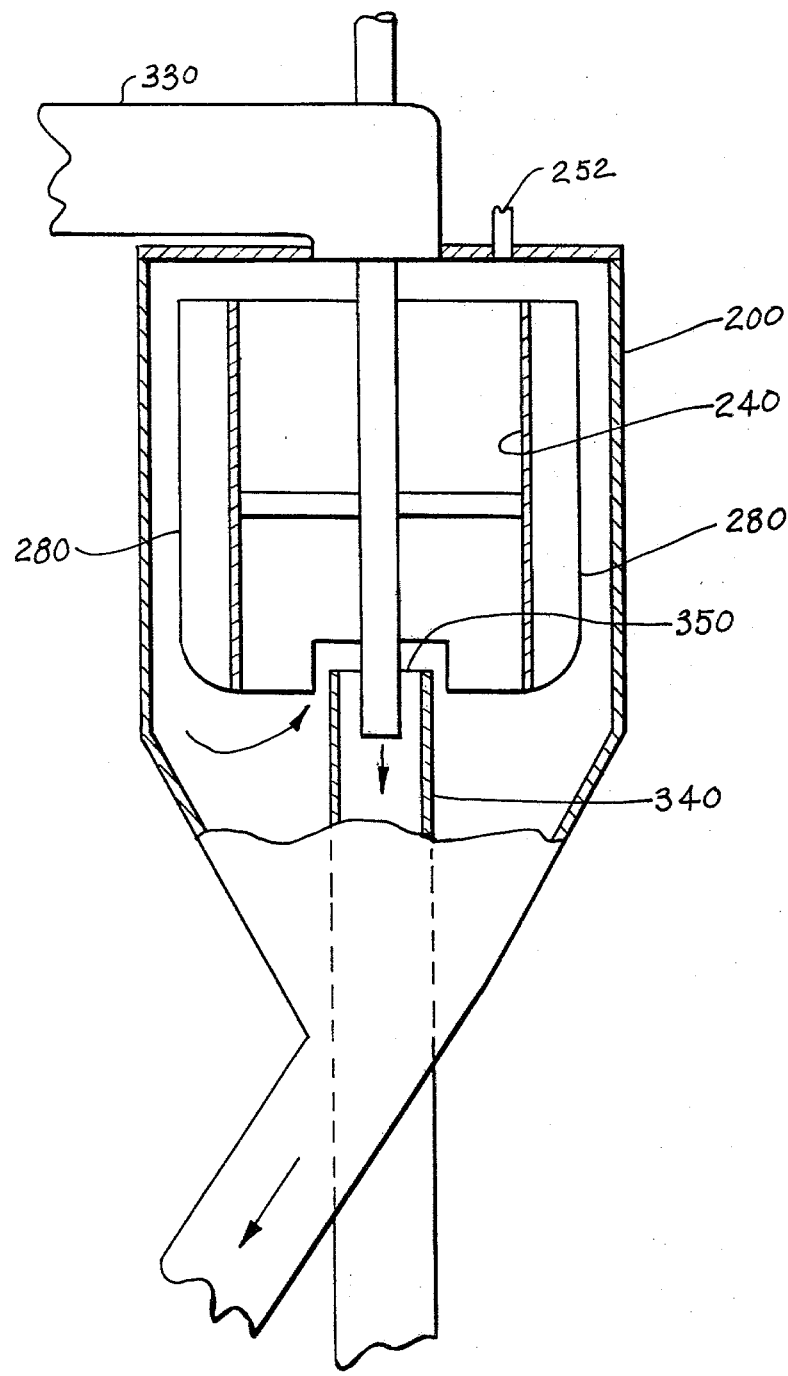
FIG. 6 is a sectional, elevational view of another modification of the centrifugal cyclone separator of the invention.

Still another form of cyclone separator, shown in FIG. 6, may be wet or dry and includes chamber 200 and rotor 230 with blades 280. A gas inlet flue 330 is coupled to the top wall of the chamber, and a gas outlet flue 340 is disposed on the vertical axis of the rotor, with its open upper end 350 just above the lower ends of the rotor blades. A solids outlet pipe 350 extends from the bottom of the chamber.

The centrifugal cyclone separators described above are more efficient than cyclone separators of the prior art because they provide increased centrifugal force, a small separating distance and long travel time of the particulate material.

The output of the separators of the invention is clean gas which will not adversely affect the blades of a fan coupled to the separators.

The above-described apparatus of the invention can be utilized in an improved, simplified and novel system for burning coal, cleaning the gases of combustion byproducts, converting $SO_2$ to $H_2SO_4$, and extracting sulfuric acid from the gases.

Figure 7:
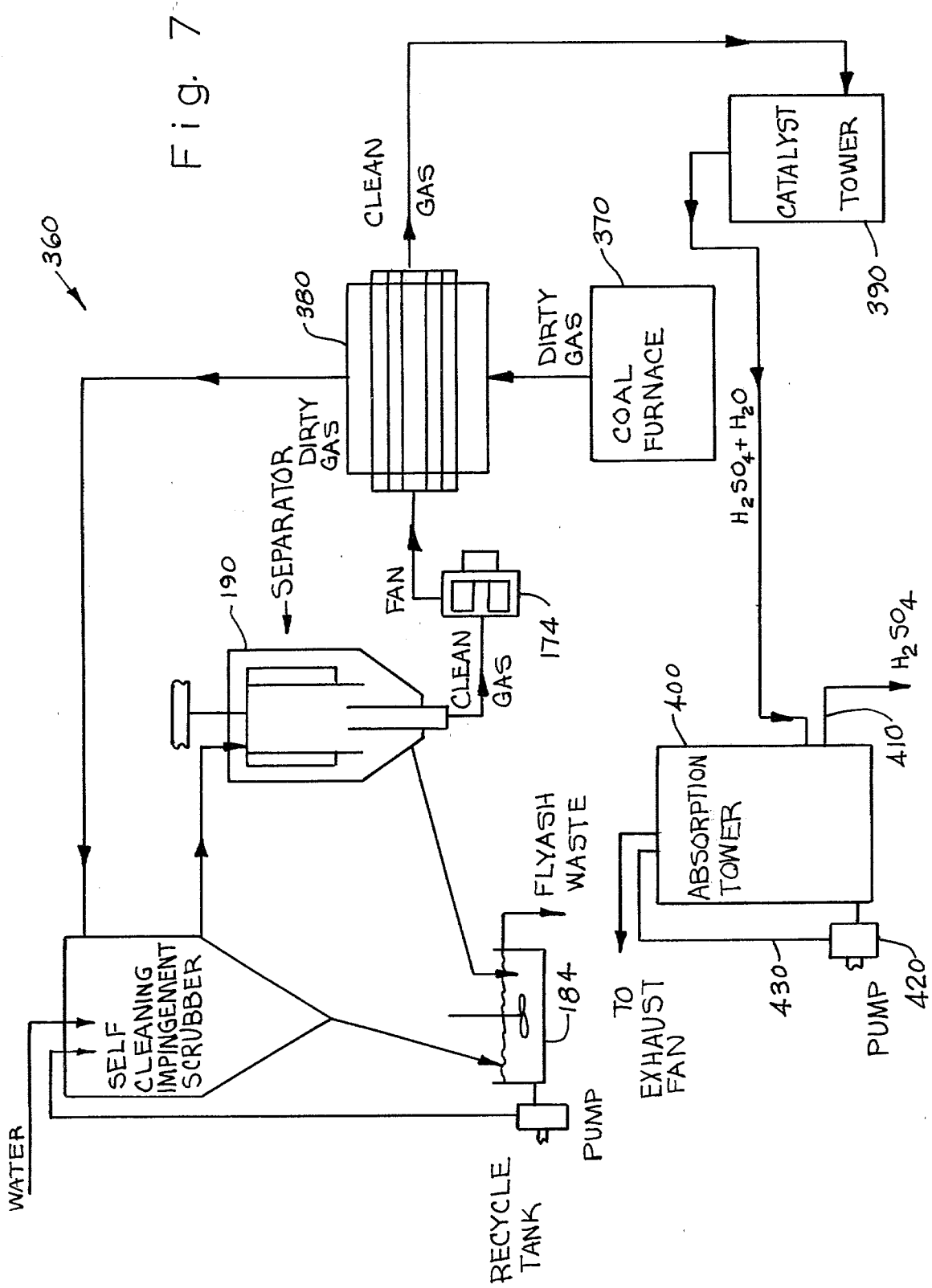
FIG. 7 is a system embodying the invention.

Such a system 360 is shown schematically in FIG. 7 and includes the impingement scrubber 10 of FIG. 1, coupled to a cyclone centrifugal separator 190 such as that shown in FIG. 3. The system 360 includes a coal burning installation 370 which produces hot, dirty gas which is coupled into a heat exchanger 380 which cools the dirty gas and feeds it to the impingement scrubber 10, in which a first cleaning operation is performed as described above. Then the cleaned gas is fed to the centrifugal cyclone separator 190 where the cleaning process is completed.

The clean gas output of the cyclone separator is fed back into heat exchanger 380 where the clean gas is heated. The heated clean gas output of the heat exchanger which is at, for example about 900° F., is then fed into a catalyst tower 390, containing vanadium or other catalyst, where the sulfur dioxide in the gas is converted to sulfuric acid. This operation also generates heat, and the hot sulfuric acid and water, at up to 1200° F., produced in the catalyst tower are fed into a packed tower 400 which serves an absorption and concentrating function on the sulfuric acid. The packed tower has a reservoir level of sulfuric acid in its base and tap means 410 for overflowing sulfuric acid above this level to storage. A pump 420 and pipe 430 are provided to recycle the sulfuric acid in the packed tower to perform the concentrating operation.

The system of FIG. 7 has the advantage that it permits the burning of coal while providing complete removal of fly ash and other particles and producing a clean gas from which sulfur dioxide can be removed as sulfuric acid. In addition, other known systems for cleaning air and removing sulfur dioxide require much more operating apparatus and are quite complex.

Prior art systems such as those of the metallurgical type require cooling towers, drying towers, packed towers, and several heat exchangers not required with the present invention.

Also, the production of acid as a by-product produces revenue instead of the usual costly procedure of neutralizing the gases with lime, with the problem then of disposing of the gypsum sludge produced.

What is claimed is:

1. Apparatus for removing matter from dirty gas comprising
    a chamber defining a downwardly vertical gas and fluid flow path,
    means for introducing a fluid vertically downwardly into said chamber,
    means for introducing into an upper portion of said chamber a gas containing matter to be removed,
    means for drawing said gas downwardly through said chamber at high velocity,
    an apertured support plate carrying solids providing a large number of small venturi passages and impingement surfaces, said plate being disposed across the path of gas and fluid flow through said chamber so that the gas to be cleaned and fluid impinge upon said solids,
    outlet means for separately removing gas and fluid carrying said matter from said chamber, and
    means coupled to said plate for vibrating said plate and the solids carried thereby to prevent matter removed from the gas from adhering thereto and blocking the passages therebetween.

2. The apparatus defined in claim 1 wherein the solids are spheres having a diameter from about one inch or more to about ⅛ inch.

3. The apparatus defined in claim 1 wherein said solids have smooth, curved surfaces and are either generally spherical, ovoid, or cylindrical in shape.

4. Apparatus for removing undesired matter from dirty gas comprising
    a chamber defining a downwardly vertical path for gas and fluid flow,
    means for introducing a fluid and a dirty gas substantially simultaneously into an upper portion of said chamber for passage downwardly through said chamber, said dirty gas containing undesired matter to be removed,
    means for drawing said gas and fluid downwardly through said chamber,
    support means carrying a plurality of small-diameter, generally spherical solids providing a large number of small venturi passages between adjacent solids and impingement surfaces, said support means being disposed across the path of flow of gas and fluid through said chamber so that the gas to be cleaned and fluid impinge upon said solids,
    outlet means for separately removing gas and fluid carrying said matter from said chamber, and
    means for vibrating said support means for shaking said solids and maintaining them free of adsorbed matter taken out of the gas.

5. Apparatus for removing matter from dirty gas comprising
    a chamber defining a downwardly vertical path for gas and fluid flow,
    means for introducing a fluid and dirty gas substantially simultaneously into an upper portion of said chamber for passage downwardly through said chamber, said dirty gas containing matter to be removed,
    means for drawing said gas and fluid downwardly through said chamber at high velocity,
    support means carrying a plurality of small-diameter solids providing a large number of small venturi passages and impingement surfaces, said support means being disposed across the path of flow of gas and fluid through said chamber so that the gas to be cleaned and fluid impinge upon said solids,
    outlet means for separately removing gas and fluid carrying said matter from said chamber, and
    means coupled to said support means for vibrating said support means and the solids carried thereby to prevent matter removed from the gas from adhering thereto and blocking the passages therebetween.

6. Apparatus for removing matter from dirty gas comprising
    a chamber defining a downwardly vertical path for gas and fluid flow,
    means for introducing a fluid and a dirty gas substantially simultaneously into an upper portion of said chamber for passage downwardly through said chamber, said dirty gas containing matter to be removed,
    means for drawing said gas and fluid downwardly through said chamber at high velocity,
    an apertured support plate carrying an array of a plurality of small-diameter solids providing a large number of small venturi passages and impingement surfaces, said array of solids being disposed across the path of flow of gas and fluid through said chamber so that the gas to be cleaned and fluid impinge upon said solids,
    outlet means for separately removing gas and fluid carrying said matter from said chamber, and
    means coupled to said plate for vibrating said plate and the solids carried thereby to prevent matter removed from the gas from adhering thereto and blocking the passages therebetween.

* * * * *